United States Patent [19]

Hou

[11] Patent Number: 5,541,986
[45] Date of Patent: Jul. 30, 1996

[54] METHOD AND SYSTEM FOR AUTOMATED TELECOMMUNICATIONS SERVICE SCRIPT CONSOLIDATION AND DOWNLOADING

[75] Inventor: David T. Hou, Freehold, N.J.

[73] Assignee: Bell Communications Research, Inc., Morristown, N.J.

[21] Appl. No.: 97,509

[22] Filed: Jul. 27, 1993

[51] Int. Cl.$^6$ ........................................... H04M 3/42
[52] U.S. Cl. ........................................... 379/201; 379/207
[58] Field of Search ........................................... 379/354, 355, 379/67, 88, 201, 94, 309, 207; 395/600; 364/200

[56] References Cited

U.S. PATENT DOCUMENTS

| | | | |
|---|---|---|---|
| 4,633,041 | 12/1986 | Boivie et al. | 379/355 |
| 4,720,849 | 1/1988 | Tayrama | 379/355 |
| 4,751,635 | 6/1988 | Kret | 364/200 |
| 4,899,373 | 2/1990 | Lee et al. | 379/201 |
| 4,991,199 | 2/1991 | Parekh et al. | 379/201 |
| 5,119,413 | 6/1992 | Okumura et al. | 379/201 |
| 5,201,045 | 4/1993 | Pflueger et al. | 379/201 |
| 5,241,588 | 8/1993 | Babson, III et al. | 379/201 |
| 5,263,159 | 11/1993 | Mitsui | 395/600 |
| 5,297,279 | 3/1994 | Bannon et al. | 395/600 |
| 5,321,833 | 6/1994 | Chang et al. | 395/600 |
| 5,323,452 | 6/1994 | Dickman et al. | 379/201 |
| 5,327,554 | 7/1994 | Palazzi, III et al. | 395/600 |
| 5,355,492 | 10/1994 | Frankel et al. | 395/600 |
| 5,455,853 | 10/1995 | Cebulka et al. | 379/207 |

OTHER PUBLICATIONS

"Customer Premises Equipment Compatibility Considerations for the Analog Display Services Interface" Bellcore Special Report, SR–INS–002461, Issue 1, Dec. 1992.

"Generic Requirements for an SPCS to Customer Premises Equipment Data Interface for Analog Display Services" Bellcore Technical Reference, TR–NWT–001273, Issue 1, Dec. 1992.

Primary Examiner—Jeffery Hofsass
Assistant Examiner—Scott Wolinsky
Attorney, Agent, or Firm—Leonard Charles Suchyta; Joseph Giordano

[57] ABSTRACT

A method and system for automatically consolidating service scripts for downloading to Analog Display Services Interface compatible screen telephones. The method and system comprises specifying a general template for a set of service features, specifying line specific attributes for a feature, and then combining the two into a service module. Both the template and service modules are specified in terms script instructions grouped in blocks defined as call states, event handlers, soft keys, or macros. A customer's service is composed of multiple service modules which, when selected, would be consolidated by a network server computer into a singular service script. The method of consolidation requires first creating software objects from the blocks in the template. Then the blocks from the service modules are incorporated into each object created by the template or if an object can't be found, a new object is created. Finally, the process of incoporation includes the insertion of the instructions from the modules into the appropriate objects according to a rank order of the intructions as determined by a ranking process in the software. The consolidated service script is then compiled for downloading and transmitted to a local processor in the compatible screen telephone.

8 Claims, 3 Drawing Sheets

"CONSISTENCY TREE"

METHOD AND SYSTEM FOR AUTOMATED TELECOMMUNICATIONS SERVICE SCRIPT CONSOLIDATION AND DOWNLOADING

TECHNICAL FIELD OF THE INVENTION

This invention relates to programing display telephone sets by downloading scripts from the network to the telephone sets. More specifically, this invention provides a system and method for automatically generating a custom service script for a display telephone set based on a user profile of requested features and sets of generic scripts for each of these features.

COPYRIGHT AUTHORIZATION

Annex E, F, and G of the disclosure of this patent document contain material which is subject to copyright protection. Bell Communications Research Inc., as the copyright owner, has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

Telecommunications services are complex and, as more services become available, the user access to these services becomes more unmanageable without user friendly assistance. Experiments by telecommunications service providers have shown that if the user interface to network services can be simplified, it is likely that users may access and use these new more complex services more often. One way to simplify access to these services is to provide the user with a screen-assisted interface to the services.

One such experiment conducted by Bell Communications Research provided a more usable access to network voice services via advanced Customer Premises Equipment (CPE) with a screen display and context-sensitive soft keys. This interface enabled the network to support screen-assisted management of CLASS$^{SM}$ and Custom Calling Services (CCS). The experiment was to determine if the utility and acceptability, and therefore, usage, of network services were positively affected by a screen-assisted telephone. Residential subscribers used a prototype CPE during the experiment and accessed network services using this device.

The prototype CPE provided a 7 line by 16 character liquid crystal display (LCD) as a visual interface that responds to user actions in context of the call states. The visual interface provides the users with context sensitive menus, step by step prompts, visual indicators of the services status, and a call log feature. This specific experiment demonstrated the acceptability of a screen-assisted telephone. It also indicated customer interest in acquiring such phones and helped to confirm that there is a need to make network services easier for customers to access and use. Visual access to voice services via display-based sets can improve the usability of current and future services by providing customers visual choices or options for services at appropriate times during a call or service transaction. To provide this capability in a generic way, the Analog Display Service Interface (ADSI) protocol has been developed to provide an interface between the network service features and the advanced CPE, such as visual displays and soft keys, and allows the network to support screen-based management of telephone services. The ADSI protocol has been publicly disclosed in Bellcore Technical Reference "Generic Requirements for an SPCS to Customer Premises Equipment Data Interface for Analog Display Services", TR-NWT-001273, December 1992.

The ADSI protocol defines a generic way for the CPE to communicate with the network switching equipment to access and invoke various service features. The CPE in using the ADSI protocol to access service features will have scripts that are executed based on user response to the call states. However, the network environment for implementing these advanced services comprises customers served from different central office switch types using different procedures for accessing the same features. Consequently, this means that the scripts in each CPE must be matched to the specific line, switch, and switch software requirements and updated when the switch software is updated or when the switch is changed. Therefore, embedded within the ADSI protocol is a feature download capability which allows the downloading of a service script from the network to the screen capable CPE. These service scripts stay resident in the CPE's memory and are used to create screen displays in response to network signals for accessing service features. These scripts can therefore be changed as the switch and switch software change and then downloaded in the CPE. If the scripts were built into the CPE, the customer would be faced with equipment that would become incompatible with the network as the network changes.

Service scripts for use in ADSI devices are defined in Bellcore Special Report entitled "Customer Premises Equipment Compatibility Considerations for the Analog Display Services Interface", SR-INS-002461, December 1992. Such scripts consist of a set of op_code instructions. However, the telephone companies do not expect a programmer to write Service Scripts in the binary op_codes as defined in DR-INS-002461. High level scripting languages are being developed for the script programmer. Appendix 2 of SR-INS-002461 illustrates scripts developed in an example high level language.

Another variation in the environment for advanced call management features in screen based telephones, in addition to the need to operate with various switch types and switch software, is that different customers have different requirements for suites of service features. Therefore, a service script to support one customer's suite of service features is going to be different than that of another customer. Consequently, there is a need to develop service scripts for various sets of features. However, to write a service script for each permutation of all feature sets becomes quite difficult as the number of features increases. Specifically, if there are m features, then there is a need for $$\sum_{r=0}^{m} \frac{m!}{r!(m-r)}$$

service scripts. For each one new feature added there will be $2^m$ more service scripts required. Building and maintaining these service scripts can, therefore, become quite labor intensive.

It is therefore an object of my invention to provide the telephone companies with the ability to build and maintain service scripts without having to write a separate script for each permutation of service features. It is a second object of my invention to provide an automated capability for developing and then consolidating service scripts for multiple features into a single service script for a customer and downloading the consolidated service script.

SUMMARY OF THE INVENTION

My method and system automatically consolidate service scripts and download such consolidated scripts to Analog Display Services Interface compatible screen telephones. The method and system comprise specifying a general template for all service features, specifying line specific attributes for a feature, and then combining the two into a service module. Both the template and module are specified in terms blocks of instructions grouped as softkeys, event handler, call states, or macros. A customer's service is composed of multiple service modules which, when selected, would be consolidated in a network server computer into a singular service script. The method of consolidation requires first creating software objects from the blocks in the template. Second, the blocks from the service modules are incorporated into each object created by the template or if an object can't be found, a new object is created. Finally, the incorporation process includes the insertion of the instructions from the modules into the appropriate objects according to a rank order of the instructions as determined by a ranking process in the software. The consolidated service script is then compiled for downloading and transmitted to a local processor in the compatible screen telephone.

DETAILED DESCRIPTION

Figure 1:
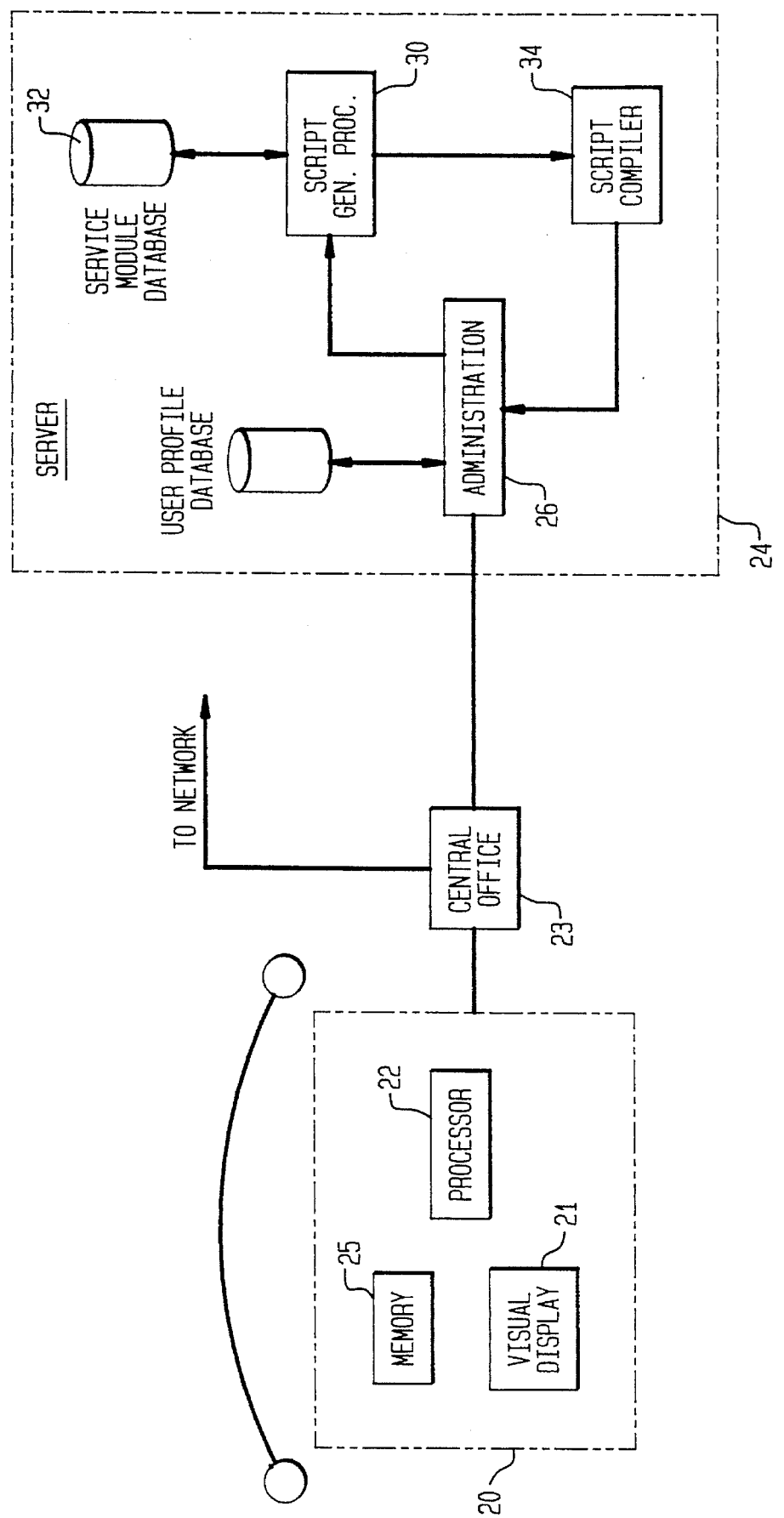
FIG. 1 is a schematic diagram of one specific illustrative embodiment of my invention.

My invention provides a system and method for automatically consolidating a set of service scripts into a single service script that is downloaded from a network server, over the interface defined by Bellcore Technical Report TR-NTW- 001273, to a display device compatible with the specifications set forth in Bellcore Special Report SR-INS-002461. In order to best understand my invention it is important to understand my overall inventive system, those constructs I call service modules and service templates, the characteristics of my high level scripting language, and my inventive method of automated service script consolidation. Accordingly, this specification is divided into four sections. The first section describes my inventive system for service script downloading as depicted in FIG. 1. The second section describes my service modules and templates. The third section describes the necessary attributes of high level ADSI service scripting. The fourth and last section describes my inventive method for using modules and templates for automated service script consolidation.

System for Service Script Downloading

One specific illustrative embodiment of a system in accordance with my invention to accomplish automated script consolidation is illustrated in FIG. 1. An ADSI compatible telephone set 20, having a visual display 21 and a processor 22 with memory 25, establishes a connection through the telephone central office 23 to an ADSI server 24. Within the server 24 a download session administrator process 26 receives the call and engages the telephone set 20 into a dialog in accordance with Bellcore TR-NWT-001273. The administrator process 26 then retrieves from a user profile database 28, that user's service profile. The profile includes all services selected by that customer for that line, including both subscription based and usage sensitive services. The session administrator process 26 forwards to a service script generation processor 30, the customer profile retrieved from database 28. The script generation process 30 then retrieves from a service module database 32 service modules that correspond to those services selected by the user as evidenced in the user profile (service modules are described in more detail in the sections below). These service modules are, ideally, modules constructed according to the requirements of my high level scripting language and service template and service module constructs described in the sections below. The script generation process 30 consolidates the selected service modules into a single service script. The single service script is forwarded to a compiler process 34 which compiles the service script generated by the script generation process 30 to produce executable code compatible with Bellcore TR-NWT-001273. The compiled executable code is forwarded by the compiler process 34 to the session administrator process 26 and is downloaded to ADSI telephone set 20 and stored in that set's processor memory 25.

In the illustrative embodiment herein, the service script generation process 30 creates a single service script from a set of service modules' scripts in accordance with my inventive method as described below.

Service Modules and Service Templates

My system for automated service script consolidation requires the development of service scripts from structures I define as service modules and service templates.

A service module is a high level set of instructions for a particular feature (features are network provided telecommunications capabilities) that can be integrated with other service modules to form a new service script. Within a service module, instructions are grouped together in blocks. For example, consider the following segment from the service module for Three Way Calling:

```
softkey3way_ADD:"Add3rdParty":"Conf"{
        do_hookflash;
        clear_display;
        clear_clipboard;
        display"PleaseWait . . . ";
        set_timer_for3sec;
        load_overlay3way_wdt;
}
```

Each set of instructions surrounded by "{"and "}" are considered a block of instructions. By creating service modules for each feature, the maintenance process is simplified as is the customizing flexibility. The maintenance process is simplified because the number of service modules to maintain grows only linearly, rather than exponentially, as the number of supported features increases. The customizing flexibility is increased because the priority of a feature can be specified on demand by the order in which the service modules are specified, instead of hard coding yet another service script.

My service templates are analogous to the base class and class template concepts in object oriented programming (OOP). The template defines a set of standard or skeletal call states and event handlers within the call states. In one illustrative embodiment of my invention the service template is nothing more than the script of the service module for Plain Old Telephone Service (POTS) as disclosed in Annex A. Once a template is defined, each service module can be created by sharing with, adding to, or specializing, the template so that the attributes of the template are inherited by all service scripts. In this way each service module becomes an derived class of the template, as per the concept of inheritance in the object oriented paradigm. Each service module shares common attributes because of the template.

Using the template technique solves problems that arise when states conflict in multiple service modules when consolidated into a single service script. All states included in the template will be public to all service modules. These are the common states, and guidelines can be set when service modules need to modify the behaviors in these common states so that conflicts can be resolved. Any other states that are not among the common states are local states. Local states are private to a particular service module. These local states need not be regulated because each is specific only to that particular service module.

The template is the common denominator for all service modules. In the illustrative embodiment described herein it is a physically separate entity even though logically it is part of all service modules. With a separate template, if modifications on the template are required in the future only one file needs be changed instead of changing the template portion of all of the service modules. Using this model, a service module is broken into 2 files, the template file and the feature specific file. However, I can envision other embodiments where the template is not physically separate from the service modules.

Figure 2:
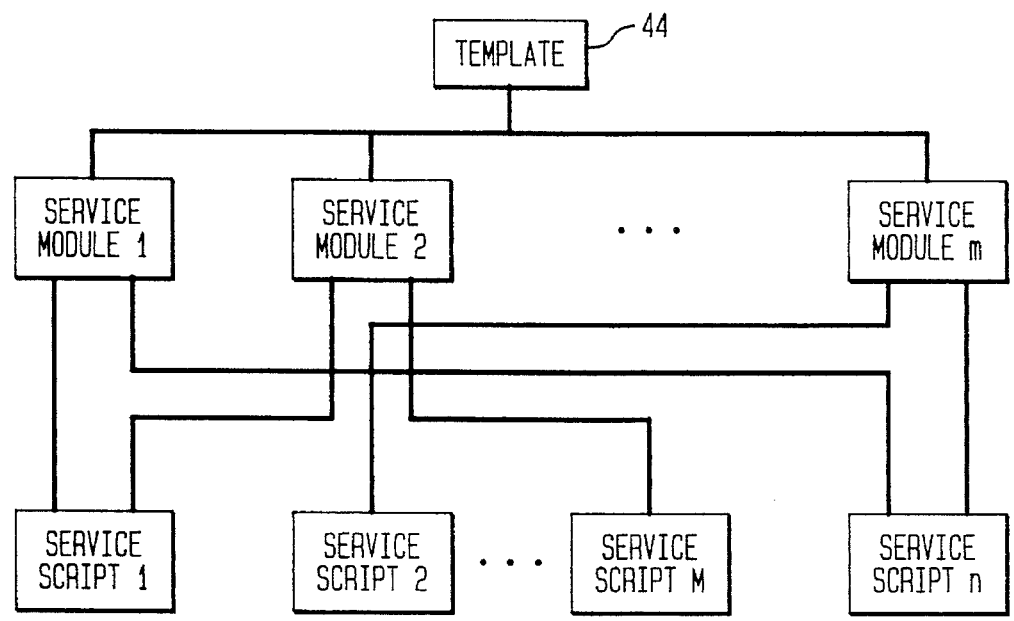
FIG. 2 is a diagram depicting the scripting level class hierarchy in my invention.

If an analogy is drawn from set theory, a service module is the union of the template file and the feature-specific file. Similarly, a service script is the union of all of the constituting service modules. Using the object-oriented paradigm, a service script can be viewed as an instance of a class which is a child class of multiple parent classes. This concept is called multiple inheritance. As an illustration, view the template as virtual base class T, each service modules as class $M_i$ (i=1,2, . . . ), and each service script as class $S_j$ (j=1,2, . . . ). Each service module is derived from the template and so class $M_i$ is a derived class of T. Now, since a service script is created by combining a set of service modules, class $S_j$ is a derived class of all of the consisting class $M_i$s. The resulting object of multiple inheritance exhibits the behaviors of all of the constituting parent classes; similarly, a service script exhibits the behaviors of all of the constituting service modules. FIG. 2 is an example of the inheritance relationship among the template, the service modules, and the service scripts. Service scripts at level 40 inherit attributes from service modules at level 42 which inherit attributes from template 44. Therefore, using these structures if changes are made in the template they will be reflected through the levels 42 to the scripts at the lower level 40.

In addition to structuring service scripts in accordance with the template and module constructs defined above, a scripting language as described below is helpful in the practice of my inventive method for service script consolidation.

Attributes of ADSI Service Scripting

Programmers are free to write service scripts in binary code as defined in the SR-INS-002461 or use a high-level scripting language/environment. The use of a high level scripting language plays a critical role in successful service script creation and management because it not only provides a more user friendly environment for the script programmer but also can act as a successful means for integration of multiple service scripts. An example of a scripting language is one that provides a one-to-one mapping between the scripting language and the op_code and return string code (rs_code instructions defined in SR-INS-002461. SR-INS-002461 defines a set of capabilities and constraints from which the scripting language defined herein is derived.

Depending on the degree of flexibility to be given to the script programmers and the type of targeted applications, the scripting language can implement all or only a subset of the instructions disclosed in SR-INS-002461. In particular, some rs_codes pertain mainly to Service Display Control applications, rather than Feature Downloaded Service Scripts. Therefore, in my scripting language, these rs_codes have been excluded from the scripting instruction set.

My scripting language reduces the complexity of script programing by using default parameters for the op_code/ rs_code whenever possible. For example op_code 1 in SR-INS-002461 requires specifying the number of instructions to be executed when the specified event occurs. For this case, the corresponding scripting instruction for op_code 1 contains a block of script instructions to be executed. The resulting number of instructions are automatically calculated and put into the proper field of op_code 1, sparing the script programmer from such meticulous details. An example of a script instruction for op_code 1 may look as follows:

```
on NORMAL_RING
    instruction 1;
    instruction 2;
    . . .
    instruction n;
end
```

When a normal power ring is detected, the specified n instructions will be executed regardless of the value of the current state ID. This set of instructions is called a block.

Another example of a scripting instruction that simplifies op_code requirements in order to make script programing easier is:

```
on NORMAL_RING
    display "New Call";
end
```

In this example, the scripting instruction display, which corresponds to op_code 3, hides a lot of complexity from script programmer. Namely, the Control field, Predefined Display ID field, Stored-at Line Number field, and the Flag ID field of op_code 3 all become transparent to the programmer. These fields are either assumed, implied, or calculated by the script compiler. In particular, the Control field (See SR-INS-002461) is assumed to be 11 (store and display); the Predefined Display ID field is implied by the string "New Call" and is assigned automatically; the Store-at-Line Number field is calculated depending on the number of consecutive display instructions; the Flag ID is assumed to be 0 (independent of flags). More complicated versions of display can be provided in case the script programmer needs the hidden flexibility, but this simplified version makes a lot of sense since these op_code fields bear these assumed/ calculated values most of the time.

To empower the script programmer beyond what is provided in SR-INS-002461, some scripting instructions can be furnished with capabilities that allow the script programmer some control over the resulting Service Script even though they have nothing to do with any op_code or rs_code. Since these added capabilities are not supported by SR-INS-002461, they impact only on the process of producing the resulting Service Scripts. Their functions are removed once the Service Script is compiled. These pseudo scripting instructions are commonly referred to as "preprocessor directives." One example of a preprocessor directive is #ifdef, which can be found in C-Language; #ifdef allows conditional inclusion of instructions before compilation. Consider the following example:

```
on IN_CALL_ANS
    clear_display;
    display "Talking to";
    #ifdef CALLER_ID
        display "$call1p";
    #else
        display "Party Unknown";
    #endif
end
```

When an incoming call is answered, the display would show the identity of the caller if the Caller_ID feature or service module is included in the Service Script; otherwise, the wording "Party Unknown", would be used instead. The resulting ANSI executable code includes either but not both. The instructions tagged with a # do not correspond to any op_code specified in SR-INS-002461.

However, some "new" scripting capabilities can be defined which actually result in a sequence of op_codes or rs_codes i.e. supported by SR-INS-002461. For example a "banner" instruction could be defined if deemed useful such that banner "One Moment, Please.";

would clear the display "One Moment, Please" wait for a few seconds, and then clear the display again. This would result in a sequence of op_codes 5, 2, and 11 if "banner" is an opcode derived instructions; or a sequences of rs_codes 0×97, 0×98 and 0×90 if it is a rs_code-derived instruction. Note that in the SR-INS-002461 specification, some op_code and rs_code functions overlap while others don't. Considerations should be taken so that an rs_code derived instruction is not confused with an op_code derived instruction and vice-versa. Both the script programmer and the script compiler need to distinguish between the two.

Procedure calls are desirable and common in programming languages but they don't exist in the context of the protocol of SR-INS-002461. However, a pseudo-procedure call can be implemented. It will not be a true procedure call because the script program pointer is memoryless; as a result there is no way to get back to where the procedure was invoked upon completing the procedure calls. Nevertheless, it does reduce the size of the resulting Service Script, and conservation of code size is one of the reasons for procedure call. A pseudo-procedure call can be implemented using the two user-definable event codes (22 and 23). Each pseudo-procedure essentially consists of op_code 1 specifying the triggering event code say, 22, plus the set of embedded instructions associated with the op_code 1. These pseudo-procedures are placed within appropriate overlays. Now, an rs_code derived scripting instruction say, go-to, can be defined to invoke the pseudo-procedure. The go-to instruction can basically consists of the Overlay rs_code(0×9D) and Event 22 Trigger rs_code (0×9e). According to the parameter(s) specified for the go_to instruction, the appropriate overlay is loaded, and event 22 is triggered; thus the corresponding pseudo-procedure is invoked and executed.

A simpler but less desirable alterative is the use of macros. Macros provide similar functions as true procedure calls, except they to not conserve any memory space the way true procedure calls do.

Since ADSI Service Scripts are event driven, the scripting language should be designed specifically to implement state machines. This means there should be a state variable upon which state transitions are triggered upon the happening of various events. I use overlays described in SR-INS-002461, as the state variable.

Another important attribute of a scripting language to be used in my inventive method and system is that the instructions are organized into manageable sized blocks. Specifically, in my scripting language all instructions are written into blocks defined as states, event handlers, soft keys, or macros. In my scripting language these blocks are delineated by brackets. Annex G is a detailed specification of the syntax of my scripting language.

Referring back to FIG. 1, my inventive system requires a script generation process 30 for consolidating service scripts. In my preferred embodiment, this script generation process accomplishes service script generation and consolidation in accordance with my inventive method, further defined below. My preferred embodiment of my inventive method requires a high-level scripting language as defined above and the service module and service template paradigm described in the previous section.

Method for Automated Service Script Consolidation

Figure 3:
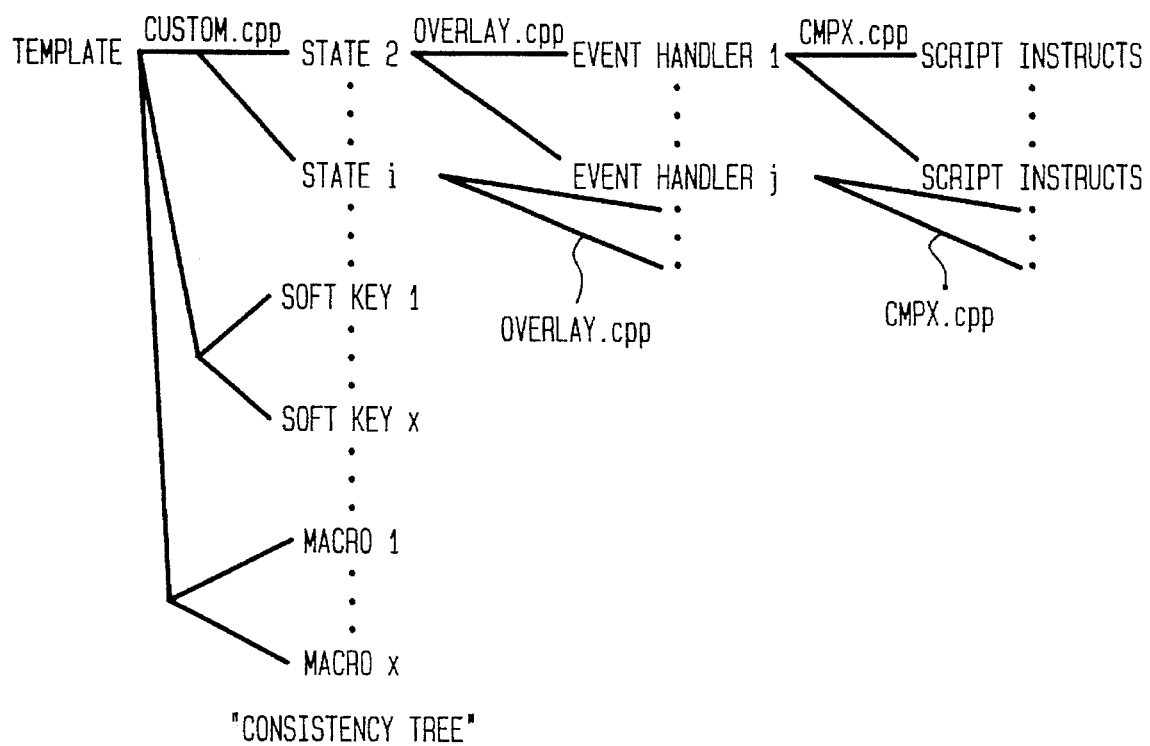
FIG. 3 is a diagram depicting a constituency tree for the template of my invention.

The script processing and consolidation is accomplished on three levels and is written in C++ object-oriented programing language. The template is the base class in an object oriented paradigm. From the template, objects based on blocks defined in the template are created. Within the blocks, other blocks are defined or script instructions are listed. Within these embedded blocks, other script instructions are listed. FIG. 3 depicts the constituency tree from the template level on down through each level of abstraction. At each level in the process of creating objects for consolidating instructions, there is a software module to accomplish this task. As an example, the software module for creating call state and softkey objects from the template and modules is depicted in Annex E which I entitle custom.cpp. Another example is the software for creating event handler objects from call states which is depicted in Annex F and which is entitled overlay.cpp. The software for consolidating script instructions within the Events is call cmpx.cpp and is shown in Annex G. Each software example follows the general simplified heuristics for creating objects to consolidate instructions as illustrated in FIG. 4.

Figure 4:
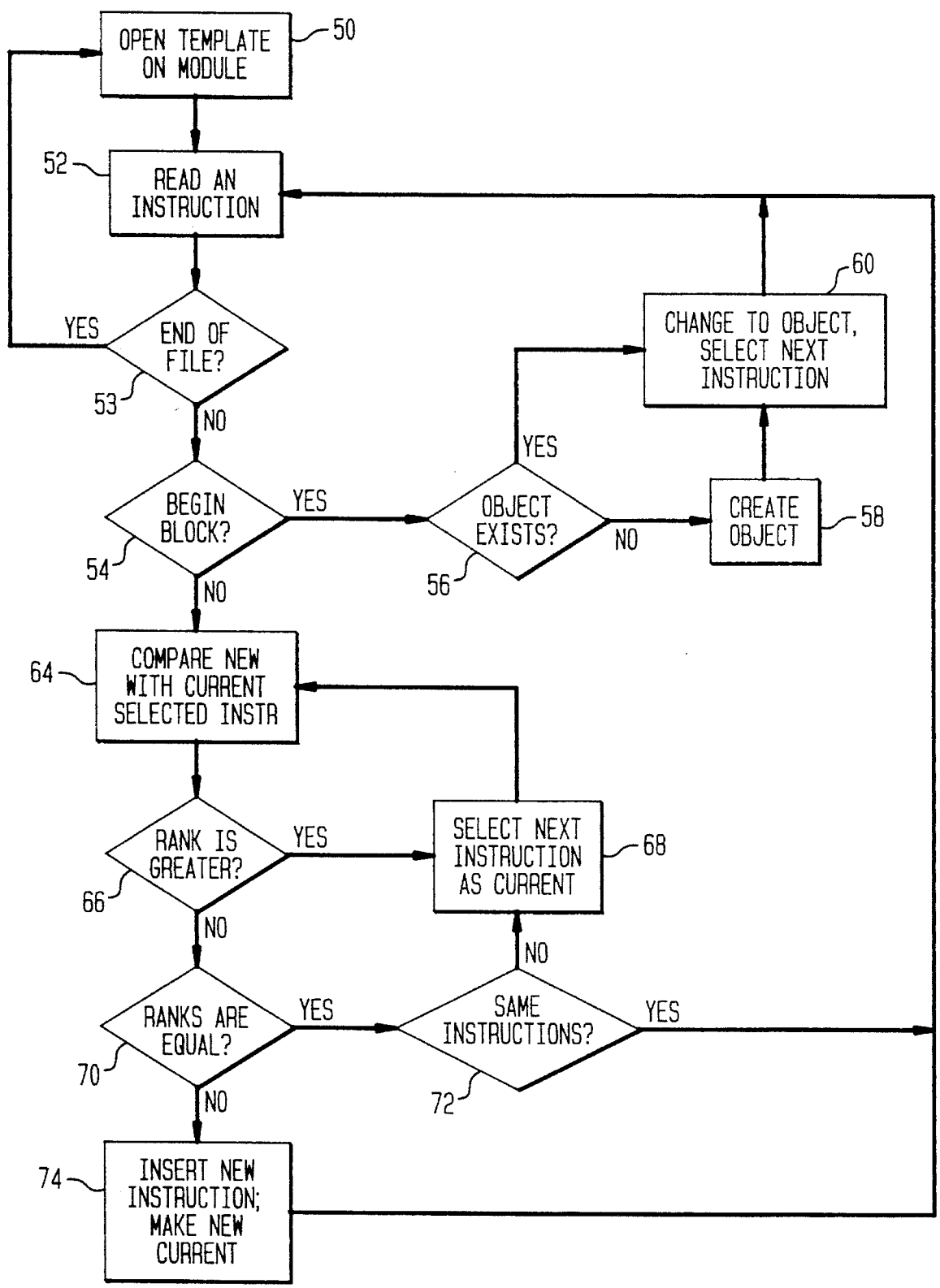
FIG. 4 is an illustrative flow chart of my inventive method.

At a high level, my inventive method as illustrated in FIG. 4 can be reduced to the following steps:

1. Begin with a template.
2. For each block in the template, create an object.
3. Open a first service module and sequentially evaluate each instruction.
4. If the instruction is at the beginning of a block, evaluate whether a corresponding Object exists in which to place the instruction.
5. If an object already exists, sequentially evaluate the instructions within the Object and repeat steps 4 and 5,
6. If an Object doesn't exist, one is created and becomes the current object.
7. If the instruction is not at the beginning of a block the instruction is inserted into the instructions within current Object in order according to a ranking determined by a coded software process.
8. After the last instruction is placed into an object, then open the next service module and repeat the process.
9. After the last service module is incorporated, the consolidated service script is forwarded to the compiler process.

As an example and to more directly describe my inventive method, consider the consolidation of the sample service module for activating a soft key shown in Annex C into the basic call template module shown in Annex B, according to the simplified heuristics of my inventive method depicted in the flow chart in FIG. 4. My inventive method begins with the template in Annex B being processed according to the process steps as defined in FIG. 4, thereby creating objects out of the blocks in the template. Specifically, the template is opened as shown in step 50 and the first instruction in Annex B "main" is read in step 52. Since this instruction is not the end of the file, as determined at step 53, but it is the beginning of a block, as determined at step 54, a determination is made to see if an object exists at step 56. Since this is the first instruction processed, an object doesn't exist and one is created in step 58. Therefore the instruction "main" which is the beginning of the block "main" is now called the object "main". This object "main" is now the current object as defined in step 60. The process returns to step 52 and reads in the next instruction, which in the present example would be the instruction "on MAKING_CALL". The "on MAKING_CALL" instruction defines the beginning of a call state block and therefore, the process in FIG. 4 would complete, in order, steps 53, 54, 56, 58, and 60 and then return to step 52. At step 52 the script instruction "clear display" from Annex B would be read. Since this instruction is not at the beginning of a block, my method would compare this script instruction to any instruction already in the object, step 64. In the present example, since there are not any instructions currently in the object, the instruction would be inserted into the current object, step 74. The "clear_display" script instruction would become the first instruction within the "on MAKING_CALL" object. This process would be repeated for all the instructions in the template in Annex B so that each of the blocks is properly "objectified" in the OOP paradigm, and each of the instructions placed within the proper object.

Once the template is processed through my method, the sample service module can be consolidated automatically into the template to produce a consolidated script. Processing the sample module shown in Annex C begins at step 52 by reading in the first instruction "softkey A: "A": "A"". This instruction is at the beginning of a block, step 54, therefore my process would look to see if an object already exists to define softkey A, step 56. Since one does not exist, a new object is created for defining softkey A, step 58. That object becomes the current object, step 60, and then the second instruction for the sample module is read. The script instruction is "send_dtmf "*#"". This instruction is not the beginning of a block, step 54, therefore this instruction is compared with the first instruction in the object "softkey A", step 64. There isn't any instruction in the object therefore, the instruction is inserted into the softkey object and made the current instruction, step 74. The process returns to the read the instruction step 52.

The next instruction from the sample module is read; that instruction is "main". The instruction "main" is the beginning of a block, and therefore the process advances from step 54 to step 56 and a determination is made to see if an object main exists. In this instance, an object "main" does exist, created when the template was objectified. The process then proceeds directly from step 56 to step 60 where the current object becomes "main" and the first instruction in the current object is selected. The process returns to step 52 where the next instruction from the Annex C is read; that instruction being "on MAKING_CALL". The process determines whether the "on MAKING_CALL" instruction is at the beginning of a block, step 54. The "on MAKING_CALL" instruction is at the beginning of a block so the next step is determine if an "on MAKING_CALL" object exists, step 56. An "on MAKING_CALL" object does exist, created during the process of objectifying the template therefore, the "on MAKING_CALL" object becomes the current object and the first script instruction from the current object is selected, step 60. The selected instruction from the object is the "clear_display" instruction. Again, the process returns to step 52 to read the next instruction from the sample module in Annex C. This next instruction is "display "Press <A> to" && "activate Service A"". This instruction is not at the beginning of a block, step 54, so it would then compare this instruction to the current instruction in the object which is the "clear_display" instruction, step 64.

In my inventive method, instructions and instruction types have a ranking. This ranking is determined by a rank order process coded within the software. If the instructions being compared had originated from the same block the rank order of the instructions is the same as they were ordered in the block before the block was made an object. My method in step 66 compares the rank of the new instruction to the rank of the current instruction, and if the rank of the current instruction is greater than the rank of the new instruction, the method would select the next instruction in the object as the current instruction, step 66. The rank comparison is repeated until either the ranks are the same, step 70, where the method then checks to see if the instructions are the same instructions, step 72. If the instructions are the same instructions then the process returns to step 52. If the instructions are not the same instructions than the next instruction in the object is selected as the current instruction. If the ranks are not equal, then the current instruction has a lower rank. The new instruction would be inserted into the object before the current instruction and this new inserted instruction would be selected as the current instruction, step 74, and then the process would return to step 52 to read the next instruction from the service module shown in Annex C.

In our example from Annex C, the "display "Press <A> to "&&" activate Service A"" instruction has a lower rank than the "clear_display" instruction in the object "on MAKING_CALL". My method would then select the next instruction from the object, step 68, which is "clear_ clipboard". This process is repeated, and because the "display "Press <A> to "&&" activate Service A"" instruction still has a lower rank, the next instruction from the object is selected as the current instruction. Again the process is repeated until the "display "Press <A> to "&&" activate Service A"" can be inserted. Annex D indicates the resulting consolidated service script that is produced when the template in Annex B is consolidated with the service module in Annex C using my inventive method.

After all the instructions are incorporated into the appropriate objects, the combined script is forwarded to a compiling process for compilation into executable code to be downloaded to the display telephone set.

Although the above is a simple example, one can readily understand the advantages of my inventive method when large number of users need to consolidate multiple service features into a single service script. My inventive method supports an automated system for consolidating service scripts, saving significant programming resources and providing significant flexibility in creating customer dependent custom service scripts.

Clearly, those skilled in the art recognize that the principles that define my method are not limited to the embodiment illustrated herein. Other embodiments may be readily devised by those skilled in the art.

ANNEX A
POTS TEMPLATE

```
macro TurnOff_ONHOOK {
        clear_display;
        clear_clipboard;
        display "Choose A Service To " && "Turn Off.";
}
macro TurnOff_OFFHOOK {
        clear_display;
        clear_clipboard;
        display "Choose A Service To " && "Turn Off.";
}
macro main:IN_CALL_ANS {
        clear_display;
        clear_clipboard;
        #ifdef CID
        #else
        display "Talking To:";
        display "Party Unknown";
        #endif
}
macro main:MAKING_CALL {
        clear_display;
        clear_clipboard;
        display "NYNEX Voice Services";
        display " ";
        display "Dial Now";
}
macro offHook:OUT_CALL_ANS {
        clear_display;
        clear_clipboard;
        display "Talking To:";
        display "$Call1p";
}
macro main:SERVICE_SELECT {
        clear_display;
        clear_clipboard;
        display "NYNEX Voice Services";
```

```
              display " ";
}
main {
        on IN_CALL_ANS
                insert_macro main:IN_CALL_ANS;
                load_overlay stableCall;
        end
        on MAKING_CALL
                insert_macro main:MAKING_CALL;
                // dial tone timer. P.S. won't work when user dials!!!
                //set_timer_for 5 sec;
                load_overlay offHook;
        end
        on SERVICE_SELECT
                insert_macro main:SERVICE_SELECT;
        end
        on NORMAL_RING
                clear_display;
                clear_clipboard;
                #ifdef CID
                #else
                display "Incoming Call From";
                display "Party Unknown";
                #endif
        end
        on RINGING_CEASED
                #ifdef CID
                #else
                exit;
                #endif
        end
} overlay offHook {
        on AUDIBLE_RINGBACK
//              clear_timer;
                clear_display;
```

```
                clear_clipboard;
                display "Ringing";
                display "$Call1p";
        end
        on OUT_CALL_ANS
//              clear_timer;
                insert_macro offHook:OUT_CALL_ANS;
                load_overlay stableCall;
        end
//      on DIAL_TONE
//              // it was not a answer during 1st ring
//              clear_timer;
//      end
//      on TIME_OUT
//              // it could be an answer during 1st ring
//              // so load stable call options
//              clear_display;
//              clear_clipboard;
//              display "Talking To";
//              display "$Call1p";
//              insert_macro main:IN_CALL_ANS;
//              load_overlay stableCall;
//      end
} overlay stableCall {
}
```

ANNEX B
SAMPLE TEMPLATE

```
softkey A : "A" : "A" {
        send_dtmf "*#";
}
main {
        on MAKING_CALL
                clear_display;
                clear_clipboard;
                display "XYZ Voice Services";
                display " ";
                load_overlay offHook;
        end
        on IN_CALL_ANS
                trigger CUSTOM_EVENT_X;
                load_overlay stableCall;
        end
}
overlay offHook {
        on OUT_CALL_ANS
                trigger CUSTOM_EVENT_X;
                load_overlay stableCall;
        end
}
overlay stableCall {
        on CUSTOM_EVENT_X
                clear_display;
                clear_clipboard;
                display "Talking to";
                display "$Call1p";
        end
}
```

ANNEX C
SAMPLE SERVICE MODULE

```
softkey A : "A" : "A" {
      send_dtmf "*#";
}
main {
      on MAKING_CALL
            display "Press <A> to " && "activate Service A";
            install_softkey A;
      end
}
```

ANNEX D
CONSOLIDATED SCRIPT OUTPUT

```
softkey A : "A" : "A" {
      send_dtmf "*#";
}
main {
      on MAKING_CALL
            clear_display;
            clear_clipboard;
            display "XYZ Voice Services";
            display " ";
            display "Press <A> to " && "activate Service A";
            install_softkey A;
            load_overlay offHook;
      end
      on IN_CALL_ANS
            trigger CUSTOM_EVENT_X;
            load_overlay stableCall;
      end
}
overlay offHook {
      on OUT_CALL_ANS
            trigger CUSTOM_EVENT_X;
            load_overlay stableCall;
      end
}
overlay stableCall {
      on CUSTOM_EVENT_X
            clear_display;
            clear_clipboard;
            display "Talking to";
            display "$Call1p";
      end
}
```

ANNEX E
CUSTOM.CPP SOFTWARE

```cpp
#include <string.h>
#include <stdio.h>
#include <stdlib.h>
#include <iostream.h>
#include "proto.h"
#include "defs.h"
#include "switches.h"
#include "olist.h"
#include "glist.h"
#include "mlist.h"
#include "overlay.h"
#include "t_defs.h"
#include "trace.h"

#ifdef WINDOWS_DLL
#include <windows.h>
endif char linebuf[80], *token[MAX_PARSE_FLDS];
int n_words;
char block_type;
MList skmacro_list; // list of softkey macros, also used in cmpx::pr_list
OList ov_list; // list of overlays
GList sk_list; // list of softkey definitions
FILE *stdio_file;

#ifdef                    WINDOWS_DLL                                    //
************************************************* extern "C" int FAR PASCAL _export customize(char *argw) ;
extern "C" char FAR * FAR PASCAL _export opcode(char *ov, char *ev) ;
extern "C" char FAR * FAR PASCAL _export rtn_string(char *lb) ;
extern "C" char FAR * FAR PASCAL _export sk_heading(char *lb) ;

int FAR PASCAL LibMain(HINSTANCE hinst,WORD wDataSeg,
        WORD cbHeapSize,LPSTR lpszCmdLine)
{
```

```
    if (cbHeapSize != 0)
        UnlockData(0);
    return 1;
} int FAR PASCAL WEP(int nParameter)
{
    return 1;
} char FAR * FAR PASCAL _export opcode(char *ov, char *ev)
{
    Overlay *dest_overlay;
    static CmpxStmt *dest_cmpx;
    static SLIST_ENTRY *stmt;

if (*ov == '\0' || *ev == '\0') {
        stmt = dest_cmpx->next_entry();
    } else {
        dest_overlay = ov_list.locate(ov);
        if (dest_overlay == NULL) return("");
        dest_cmpx = dest_overlay->locate(ev);
        if (dest_cmpx == NULL) return("");
        stmt = dest_cmpx->first_entry();
    }
    if (stmt->statement == NULL) return("");
    else return(stmt->statement);
} char FAR * FAR PASCAL _export rtn_string(char *label)
{
    static GenBlock *dest_softkey;
    static GBLIST_ENTRY *rtnstr;

if (*label == '\0') {
        rtnstr = dest_softkey->next_entry();
```

```
   } else {
      dest_softkey = sk_list.locate(label);
      if (dest_softkey == NULL) return("");
      rtnstr = dest_softkey->first_entry();
   }
   if (rtnstr->statement == NULL) return("");
   else return(rtnstr->statement);
} char FAR * FAR PASCAL _export sk_heading(char *label)
{
   GenBlock *dest_softkey;

if (*label != '\0') {
      dest_softkey = sk_list.locate(label);
      if (dest_softkey == NULL) return("");
      return(dest_softkey->get_heading());
   } else
      return("");
}

// NOTE: argw must have a dummy first word to displace argv[0]!!!
int FAR PASCAL _export customize(char *argw)
{
   char cmd_line[200];
   char *argv[MAX_PARSE_FLDS];
   int argc;

strcpy(cmd_line,argw);
   argc = parse(cmd_line,argv,MAX_PARSE_FLDS);

endif ifdef                    DOS_CMD_LINE                      //
*******************************************************
```

```c
int main(int argc, char *argv[])
{ endif ifdef          DOS_FILE_INPUT                          //
********************************************************* int customize(unsigned char sw_type, FLIST *flp)
{
    FLIST *flp_head=flp;
    FILE *mdtable;

#endif//*****************************************************************

FILE *scp_file, *dest_file;
    char module[40], interim_outfile[40], script_outfile[40];
    char path[40];
    char tmp_buf[80];
    int line_no, i, j, pass;
    SKMacro *dest_skmacro;
    Overlay *dest_overlay;
    GenBlock *dest_softkey;
    GList def_list; // list of #define's
    char module_id, *tp;
    unsigned char skip; // skip current statement if none-zero skip = 0;
    block_type = BT_NONE;
    module_id = 0; // must start with > 0
    *path = '\0';
    flag_mgr(0,""); // initialize flag_mgr
    //default interim output is INTERIM_OUTFILE, and SCRIPT_OUTFILE
    strcpy(interim_outfile,INTERIM_OUTFILE);
```

```
strcpy(script_outfile,SCRIPT_OUTFILE);
if ((stdio_file = fopen(STDIO_OUTFILE,"w")) == NULL) return(-1);
fclose(stdio_file);

TRACE(">>> CUSTOMIZING...\n",NULL);

#ifndef                    DOS_FILE_INPUT                    //
***************************************************** if (argc == 1) {
        TRACE("Usage:    getscp    -o<interim_outfile>    -d<module_path>
<module_file_list>\n",NULL);
        return(-1);
    }
    for (i=1; i<argc; ++i) {
        if (*argv[i] == '-') {
            if (*(argv[i]+1) == 'o') { //-oOutput_filename option used
                strcpy(interim_outfile,argv[i]+2);
                /* extract output file path to be used by script_outfile */
                j=strlen(interim_outfile)-1;
                while (j >= 0 && interim_outfile[j] != '\\') j--;
                if (j >= 0) { // not for current directory
                    strcpy(script_outfile,interim_outfile);
                    script_outfile[j+1] = '\0';
                    strcat(script_outfile,SCRIPT_OUTFILE);
                }

} else { // -dPath option used
                strcpy(path,argv[i]+2);
                strcat(path,"/");
            }
        }
    } for (pass=1; pass<=2; pass++) {
```

```
    TRACE(" Pass %d...\n",pass);
    //read all modules in order, one at a time
    for (i=1; i<argc; ++i) {
        if (*argv[i] == '-') continue;
        strcpy(module,path);
        strcat(module,argv[i]);
        if (pass == 2) {
            TRACE("\t%s\n",module);
        } else //**************DOS_FILE_INPUT************************ if ((mdtable = fopen(SW_DIR_TABLE,"r")) == NULL) {
        TRACE("Error: File %s note found!!\n",SW_DIR_TABLE);
        return(NULL);
    }
    //j is used in case the FEATURE_TABLE is not terminated correctly
    j = 255;
    fscanf(mdtable,"%d %s", &i, path);
    while (i != sw_type && i != 255 && i != j) {
        j = i;
        fscanf(mdtable,"%d %s", &i, path);
    }
    fclose(mdtable);
    if (i == 255 || i == j) {
        TRACE("Error: Unknown (switch) directory id: %d\n",(int)sw_type);
        return(-1);
    } for (pass=1; pass<=2; pass++) {
    TRACE(" Pass %d...\n",pass);
    flp = flp_head;
    //read all modules in order, one at a time
    for (; flp != NULL; flp = flp->next) {
        if (get_module(module,path,flp->fid) == NULL)
            continue;
```

```
            if (pass == 2)
                TRACE("\t%s\n",module);

#endif//
    **************************************************** if ((scp_file = fopen(module,"r")) == NULL) {
            TRACE("Error: File \"%s\" not found!\n",module);
            return(-1);
            //continue;
        } module_id++;
        line_no = 0;
        skip = 0;

if (pass == 1) {// collect the #define's in all modules first while (readline(linebuf,sizeof(linebuf),scp_file) != EOF) {
                strcpy(tmp_buf,linebuf);
                n_words = parse(tmp_buf,token,MAX_PARSE_FLDS);
                if (n_words == 0) continue; // bug in dll if not included
                if (strcmp(token[0],"#define") == 0) {
                    TRACE("\t%s\n",token[1]);
                    def_list.add(token[1],(GenBlock *)NULL);
                // *** saving some time if included
                //} else if (strcmp(token[n_words-1],"{") == 0) {
                //    break; // stop searching for #define in this file
                }
            }

} else {// pass 2 while (readline(linebuf,sizeof(linebuf),scp_file) != EOF) {
                line_no++;
```

```
if (*linebuf == '\0') continue;
strcpy(tmp_buf,linebuf);
n_words = parse(tmp_buf,token,MAX_PARSE_FLDS);
if (*token[0] == '\/') continue; // skip comments //if (*linebuf == '#') {
if (*token[0] == '#') {
    if (strcmp(token[0],"#ifdef") == 0) {
        if (!def_list.isFound(token[1])) skip = 1;
    } else if (strcmp(token[0],"#else") == 0) {
        skip = !skip;
    } else if (strcmp(token[0],"#endif") == 0) {
        skip = 0;
    } else if (!strcmp(token[0],"#define") == 0) {
        TRACE("ERROR: Unknown Statement found in file %s\n",module);
        TRACE("Line %d\n",line_no);
        TRACE("%s\n",linebuf);
        return(-1);
    }
    continue;
} if (skip) continue;

// begin of block
if (strcmp(token[n_words-1],"{") == 0) {
    if (strcmp(token[0],"main") == 0 ||
            strcmp(token[0],"overlay") == 0)
    {
        block_type = BT_OVERLAY;
        char *ov_name = (n_words == 2) ? token[0] : token[1];
        dest_overlay = ov_list.locate(ov_name);
        if (dest_overlay == NULL) { // not found
            dest_overlay = new Overlay(linebuf);
            if (dest_overlay == NULL) {
```

```
                TRACE("Error: Out of Memory!!\n",NULL);
                exit(-1);
            }
            ov_list.add(ov_name,dest_overlay);
        }
    } else if (strcmp(token[0],"softkey") == 0) {
        block_type = BT_SOFTKEY;
        dest_softkey = new GenBlock(linebuf);
        if (dest_softkey == NULL) {
                TRACE("Error: Out of Memory!!\n",NULL);
                exit(-1);
        }
        sk_list.add(token[1],dest_softkey);
    } else { // softkey macro
        block_type = BT_SK_MACRO;
        dest_skmacro = skmacro_list.locate(token[1]);
        if (dest_skmacro == NULL) {
                dest_skmacro = new SKMacro(linebuf);
                if (dest_skmacro == NULL) {
                TRACE("Error: Out of Memory!!\n",NULL);
                exit(-1);
                }
                skmacro_list.add(token[1],dest_skmacro);
        }
    }

// in middle of the block or other preproc statement
} else {

// process flag id if is a flag related statement
    if (n_words > 1 &&
        strcmp(token[n_words-2]+strlen(token[n_words-2])-4,
        "flag")==0) // 4 is the len of "flag"
    {
        if (flag_mgr(module_id,linebuf)) {
                /*
```

```
                strcpy(tmp_buf,linebuf);
                n_words = parse(tmp_buf,token,MAX_PARSE_FLDS);
                */
            } else {
                TRACE("ERROR: Flag assignment depleted!\n",NULL);
                return(-1);
            }
        } switch (block_type) {
        case BT_OVERLAY:
            dest_overlay->file_this_line(module_id);
            break;
        case BT_SOFTKEY:
            dest_softkey->file_this_line();
            break;
        case BT_SK_MACRO:
            dest_skmacro->file_this_line(module_id);
            break;
        default:
            break;
        }
      }
    } // while loop: read line
  } // if pass else
  fclose(scp_file);
 } // for loop: read file
} // for loop: pass if ((dest_file = fopen(interim_outfile,"w")) == NULL) {
    TRACE("Error: Can't Create File %s\n",interim_outfile);
    return(-1);
} else {
    skmacro_list.check(&sk_list);// handle cases where there are >6 softkeys
    sk_list.pr_list(dest_file);
    ov_list.pr_list(dest_file);// softkey macros get expanded here
```

```
fclose(dest_file);
skmacro_list.clear_list();

/*??? commented because opcode() & rtn_string() need the lists
sk_list.clear_list();
ov_list.clear_list();
*/ def_list.clear_list();
TRACE(">>> COMPILING...\n",NULL);
if (translate(interim_outfile,script_outfile) == FAIL) return(-1);
TRACE("Successful!\n",NULL);
TRACE("ESL Output File: %s\n",interim_outfile);
TRACE("ADSI Output File: %s.\n",script_outfile);
return(1);
```

ANNEX F
OVERLAY.CPP SOFTWARE

```cpp
#include <stdio.h>
#include <string.h>
#include <stdlib.h>
#include <iostream.h>
#include "overlay.h"
#include "global.h"
#include "trace.h"

void Overlay::file_this_line(char a_module_id) {
  CmpxStmt *cmptr;
  char label[40];
  int i;
  if (strcmp(token[0],"on") == 0) {
    *label = '\0';
    for (i=1; i<n_words; i++) {
        // include states in cmpx block label
        if ((i % 2) == 0) continue; // don't waste space
        strcat(label,token[i]);
        // to allow 2-digit states, ie instead of CALLER_ID123
        // have CALLER_ID_12_3
        strcat(label,"_");
    }
    if (label[i=strlen(label)-1] == '_') label[i] = '\0';

if ((cmptr=locate(label)) == (CmpxStmt *) NULL) {
        cmptr = new CmpxStmt(linebuf);
        if (cmptr == NULL) {
           TRACE("Error: Out of Memory!!\n",NULL);
           exit(-1);
        }
        add(label,cmptr);
    }
  } else if (strcmp(token[0],"}") != 0)
      current->the_obj->file_this_line(a_module_id);
  else
      block_type = BT_NONE;
```

}

```
void Overlay::add( char *a_label, CmpxStmt *an_obj)
{
  current = new CLIST_ENTRY;
  if (current == NULL) {
    TRACE("Error: Out of Memory!!\n",NULL);
    exit(-1);
  }
  current->next = NULL;
  if (tail != NULL) tail->next = current;
  tail = current;
  if (head == NULL) head = current;
  strcpy(current->the_label,a_label);
  current->the_obj = an_obj;
}

CmpxStmt* Overlay::locate(char *a_label) {
  CLIST_ENTRY *p;
  for (p = head; (p != (CLIST_ENTRY *)NULL) &&
       (strcmp(p->the_label,a_label) != 0); p = p->next )
    ;
  if (p == (CLIST_ENTRY *)NULL)
    return (CmpxStmt *)NULL;
  else {
    current = p;
    return p->the_obj;
  }
} void Overlay::clear_list() {
  CLIST_ENTRY *temp;
  while (head != NULL) {
    temp = head;
    if (temp->the_obj != NULL) {
      delete temp->the_obj;
```

```
        }
        head = head->next;
        delete temp;
    }
    tail = current = NULL;
} void Overlay::pr_list(FILE *dest_file) {
    CLIST_ENTRY *p = head;
    //cout << heading << endl;
    fprintf(dest_file, "%s\n", heading);
    while (p != NULL) {
        if (p->the_obj != NULL) p->the_obj->pr_list(dest_file);
        p = p->next;
    }
    //cout << "}" << endl;
    fprintf(dest_file, "}\n");
}
```

ANNEX G
CMPX.CPP SOFTWARE

```cpp
#include <stdio.h>
#include <string.h>
#include <iostream.h>
#include <stdlib.h>
#include "cmpx.h"
#include "global.h"
//#include "defs.h"
#include "proto.h"
#include "skmacro.h"
#include "trace.h"

void CmpxStmt::file_this_line(char a_module_id) {
   char *keyword = token[0];
   if (strcmp(keyword,"end") != 0)
      sort(linebuf, a_module_id);
} char CmpxStmt::rank(char *keyword) {
   if (strcmp(keyword,"clear_display") == 0)
      return(RK_CLEAR_DISPLAY);
   else if (strcmp(keyword,"display") == 0)
      return(RK_DISPLAY);
   else if (strcmp(keyword,"install_softkey") == 0)
      return(RK_INSTALL_SOFTKEY);
   else if (strcmp(keyword,"insert_macro") == 0)
      return(RK_INSERT_MACRO);
   else if (strcmp(keyword,"load_overlay") == 0)
      return(RK_LOAD_OVERLAY);
   else if (strcmp(keyword,"exit_script") == 0)
      return(RK_EXIT_SCRIPT);
   else
      return(RK_ALL_OTHERS);
} void CmpxStmt::sort(char *a_string, char a_module_id)
{
```

```
char rk = rank(token[0]);
SLIST_ENTRY *p, *new_entry, *tptr; //tptr is before p if (old_module_id != a_module_id) {
    p = current = head;
    old_module_id = a_module_id;
} else p = current->next;

tptr = current;

for (; p != NULL && rk < p->rank; p = p->next )
    tptr = p;

if (p == NULL) { // insert at the end
    current = new SLIST_ENTRY;
    if (current == NULL) {
        TRACE("Error: Out of Memory!!\n",NULL);
        exit(-1);
    }
    current->rank = rk;
    strcpy(current->statement,a_string);
    if (tptr != NULL) tptr->next = current;
    // else the very first statement
    current->next = NULL;
    if (head == NULL) head = current;
} else { // same or higher rank, tptr not NULL
    for (; p != (SLIST_ENTRY *)NULL &&
           rk == p->rank &&
           strcmp(a_string,p->statement) != 0; p = p->next)
        tptr = p;
    if (p == NULL) { // add statement at end
        current = new SLIST_ENTRY;
        if (current == NULL) {
            TRACE("Error: Out of Memory!!\n",NULL);
            exit(-1);
        }
```

```
            tptr->next = current;
            current->next = NULL;
            current->rank = rk;
            strcpy(current->statement,a_string);
        } else if (rk != p->rank) { // insert statement, could be at beginning
            current = new SLIST_ENTRY;
            if (current == NULL) {
                TRACE("Error: Out of Memory!!\n",NULL);
                exit(-1);
            }
            current->rank = rk;
            strcpy(current->statement,a_string);
            current->next = p;
            if (tptr == p)
                head = current;
            else
                tptr->next = current;
        }
    }
}

SLIST_ENTRY* CmpxStmt::locate(char *a_string) {
    SLIST_ENTRY *p;
    for (p = head; (p != (SLIST_ENTRY *)NULL) &&
            (strcmp(p->statement,a_string) != 0); p = p->next )
        ;
    return p;
} void CmpxStmt::clear_list() {
    SLIST_ENTRY *temp;
    while (head != NULL) {
        temp = head;
        head = head->next;
        delete temp;
    }
```

```
    current = NULL;
} void CmpxStmt::pr_list(FILE *dest_file) {
  SLIST_ENTRY *p = head;
  SKMacro *skmacro_ptr;
  char macro_label[40];

fprintf(dest_file,"%s\n",heading);
  while (p != NULL) {
    if (p->rank == RK_INSERT_MACRO) {
      parse(p->statement,token,MAX_PARSE_FLDS);
      skmacro_ptr = skmacro_list.locate(token[1]);
      if (skmacro_ptr != NULL) skmacro_ptr->pr_list(dest_file);
      else TRACE("Error: Can't find macro: %s\n",token[1]);

// not softkey macro statement
    } else
      fprintf(dest_file,"%s\n",p->statement);
    p = p->next;
  }
  fprintf(dest_file,"\tend\n");
}
```

I claim:

1. A method for consolidating a plurality of service modules into a single service script for downloading into telecommunications customer premises equipment, said method comprising the steps of:

defining a service template having blocks of script instructions upon which all service modules will be based;

specifying a plurality of service modules each having their own blocks of instructions for a plurality of particular features associated with a particular customer; and consolidating said template and said plurality of service modules into a single service script for said particular customer, said consolidating, executed by a data processor, comprising organizing said blocks of instructions from said template into software objects, incorporating said blocks of instructions from said plurality of service modules into said software objects by inserting said instructions in corresponding software objects in order according to a ranking value associated with each instruction.

2. The method as recited in claim 1 further including the step of compiling said single service script into executable code for downloading from a server to said telecommunications customer premises equipment.

3. A system for automatically consolidating a plurality of service modules into a single service script comprising:

a first database containing a plurality of service modules each having blocks of instructions;

a second database of customer profiles; and service script creation means for retrieving from said second database a customer profile and selecting and retrieving from said first database, service modules according to said retrieved customer profile, said service script creation means comprising
means for creating software objects from blocks of instructions within a defined service template; and
means for incorporating said blocks of instructions from said service modules into corresponding software objects according to a ranking value.

4. The system of claim 3 further comprising:

a script compiler for compiling said single service script into executable code capable of being downloaded to an analog display services interface compatible screen telephone.

5. In a telecommunications system having display telephone sets and having a database of service modules having blocks of instructions, and a database of user profiles and having a server for downloading service scripts to the display telephone sets, a method for automatically consolidating service modules into a single service script executed by said server, comprising the steps of:

retrieving a user profile from said database of user profiles associated with one of said display telephone sets;

reading the user profile to determine the service features selected by the user and retrieving from said service module database the service modules corresponding to the services features selected by the user;

using one of said retrieved service modules as a template;

defining each block of instructions in said template as an object;

selecting a next service module;

parsing blocks of instructions from said next service module;

comparing each of said blocks of instructions to said objects and inserting each instruction from said blocks into a corresponding one of said objects;

creating a new object if one doesn't exist;

ordering the instructions within each object according to a ranking value; and repeating said selecting, parsing, comparing, creating and ordering steps for each service module.

6. The method in accordance with claim 5 further including the steps of:

compiling said single service script into code executable by said one of said display telephone sets;

downloading said executable code from said server to said display telephone set.

7. The method in claim 5 wherein said creating a new object step includes the steps of:

creating objects from blocks of instructions that define call states and soft keys; and creating event handler objects within said objects created from said call states.

8. The method of claim 5 wherein said service module used as said template is for Plain Old Telephone Service (POTS).

* * * * *